April 22, 1958 C. P. SPAETH 2,831,882
PREPARATION OF NITRITE ESTERS
Filed Sept. 16, 1955
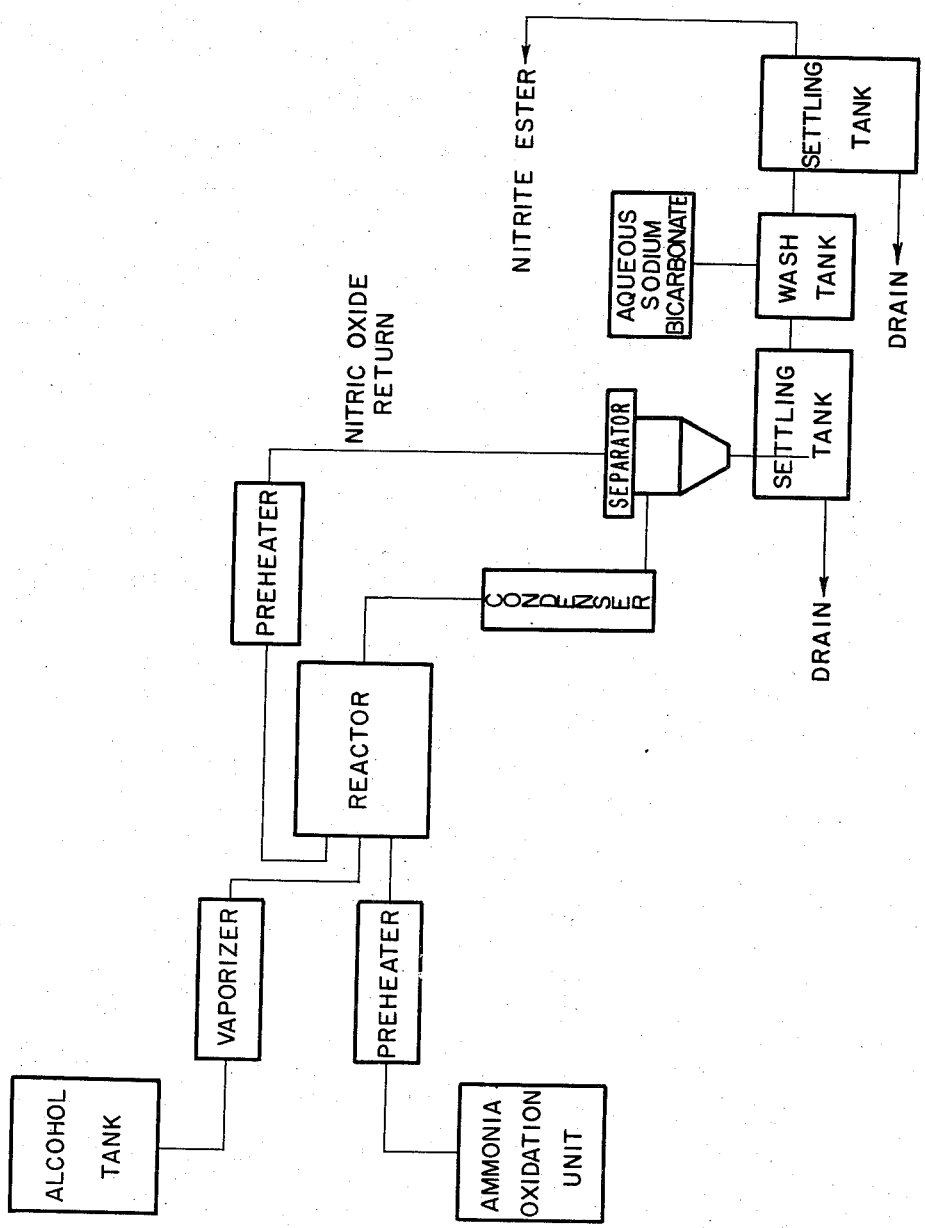
INVENTOR.
CHARLES PHILIP SPAETH
BY
ATTORNEY 2,831,882
PREPARATION OF NITRITE ESTERS Charles Philip Spaeth, Woodbury, N. J., assignor to E. I. du Pont de Nemours and Company, Wilmington, Del., a corporation of Delaware Application September 16, 1955, Serial No. 534,663

7 Claims. (Cl. 260—466)

The present invention relates to a novel process for the preparation of nitrite esters. More particularly, the present invention relates to a vapor phase synthesis of nitrite esters from alcohols.

The accepted procedure for preparing nitrite esters has been the liquid phase reaction of an alcohol with nitrous acid produced in situ, e. g., the reaction of sodium nitrite and sulfonic acid. The reaction must be conducted slowly under constant refrigeration to prevent the loss of the nitrous acid, and is therefore a long drawn out and painstaking operation. Many text books or organic chemistry report that nitrite esters can be produced by the reaction of nitrogen oxides and an alcohol. Exhaustive searches of the literature indicate that this statement is, in all probability, based on the work of Williams and Smith, as reported in the Pharm. Journal No. 16, pp. 499–501 (1855). In this article, it is stated that the gases produced by the reaction of arsenious acid and nitric acid, preferably of density 1.35, form amyl nitrites when passed through a cooled amyl alcohol. The large loss of nitrogen oxides was noted, despite the strong cooling employed.

In a paper by Yoffe and Gray, Jour. Chem. Soc. (June, 1951) 1412–14, the room temperature reaction of dinitrogen tetroxide and ethyl and methyl alcohol in the liquid and vapor phase is discussed. The authors report that the reaction was rapid and resulted in the formation of the nitrite esters and nitric acid.

Nitrite esters have frequently been considered for use as intermediates in organic synthesis, and have been used in small quantities as pharmaceutical chemicals. The high cost of production has prevented any widespread evaluation of these compounds for industrial uses. Therefore, a low cost process for preparing nitrite esters in large quantities is highly desirable.

It is an object of the present invention to provide a process for the preparation of nitrite esters of high purity and in good yield. A further object of the present invention is to provide a process for the preparation of nitrite esters adapted to be operated continuously. Additional objects will become apparent as the invention is further described.

I have found that the foregoing objects may be attained when I react an alcohol with a mixture of nitrogen dioxide and nitric oxide in the presence of an inert diluent at a temperature between 100° C. and 420° C. The reaction is a vapor phase reaction and the reactants will be present in the ratio of from 0.4 to 0.6 mole of $NO_2$, 0.4 to 2.0 moles of NO and 2 to 25 moles of diluent per mole of alcohol.

In this specification, the terms nitrogen dioxide ($NO_2$) and nitric oxide (NO) refer to these reactants in the gaseous state at or above 100° C. In the gaseous state both of these oxides of nitrogen are paramagnetic, that is, they have unpaired electrons and are, therefore, understood to be free radicals.

In the preferred operation, the reactants will be pre-heated to the predetermined reaction temperature before being introduced into the reactor where they are combined, and will be in the reaction zone for from two to four seconds.

The source of the nitrogen oxides is not critical to the present invention, and they may therefore be provided by the decomposition of nitric acid and/or nitrogen dioxide at the reaction temperature, or they may be introduced into the reaction zone directly from a source such as an ammonia oxidation unit. The invention includes the esterification of primary, secondary and tertiary alcohols.

In order to more fully describe the present invention, reference is made to the accompanying drawing which represents a schematic arrangement suitable for carrying out the present process.

In the drawings, all of the units are labeled to indicate their function, the design and operation of the actual apparatus not being a part of the present invention. In operating in accordance with the set-up illustrated, alcohol from the alcohol tanks is fed to the reactor via a vaporizer where it is vaporized and heated to the predetermined reaction temperature. Simultaneously a mixture of nitrogen dioxide, nitric oxide and water, or nitrogen, or both, from an ammonia oxidation unit is fed to the reactor via a preheater where the mixture is heated to the reaction temperature. The vaporized alcohol and the nitrogen-oxides, diluent mixture are fed into the reactor at such rates as to produce a reaction mixture having the desired molar ratios within the reactor, and to be retained therein for from 2 to 4 seconds. The reaction mixture is then fed to the condenser where it is cooled. From the condenser, the remaining gases and the condensate are introduced into a separator, for example, a cyclone type. The uncondensed portion consists essentially of nitric oxide and nitrogen which are returned to the reactor via a preheater. The condensate consists essentially of the desired nitrite ester, nitric acid, water, and some oxidation products of the alcohol. The condensate, after separation from the nitric oxide, is fed to a settling tank, and by simple stratification the nitrite ester is separated from the bulk of the water and nitric acid. The nitrite ester is then washed in a wash tank with aqueous sodium carbonate or bicarbonate to remove the residual acid, and finally separated by stratification in a settling tank.

Where nitric acid or nitrogen dioxide alone are used as the source of the nitrogen oxides, the preheater illustrated between the ammonia oxidation unit and the reactor becomes a vaporizer. The thermal decomposition of nitric acid is believed to produce the hydroxyl radical and nitrogen dioxide. The reaction:

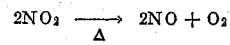
$$2NO_2 \xrightarrow{\Delta} 2NO + O_2$$

is also well known. Thus, it is apparent that the introduction of the nitrogen oxides in the form of nitric acid or of nitrogen dioxide does not represent a different reaction than that obtained by introducing nitric oxide and nitrogen dioxide directly.

The reaction by which the alcohol is converted to the nitrite ester may be symbolized as follows:

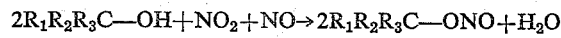
$$2R_1R_2R_3C-OH + NO_2 + NO \rightarrow 2R_1R_2R_3C-ONO + H_2O$$

It is essential to have a diluent present to moderate the reaction and thereby prevent the formation of excessive amounts of undesirable by-products. When nitric acid is used, the addition of outside diluents is unnecessary, since sufficient water will be present. When the nitrogen oxides are used, a diluent must be added concurrently with the oxides. As the diluent, I may use water, nitrogen, carbon dioxide, or other inert compounds which will absorb heat. I prefer to have from two to twenty-five moles of diluent per mole of alcohol present in the reaction zone.

The following table fully illustrates the application of the present invention to a variety of alcohols and at various operating conditions. In each case, the procedure followed was essentially that set forth in the description of the accompanying drawing, using nitric oxide, nitrogen dioxide, and water in the proportions indicated.

TABLE I

| Alcohol | Mole Ratio of Reactants | | | | Temp.,* °C. | Contact Time, Sec. | Purity, Percent | Conversion, Percent |
|---|---|---|---|---|---|---|---|---|
| | NO | NO₂ | H₂O | Alcohol | | | | |
| n-Butyl | 3.0 | 1.0 | 4.1 | 2.0 | 189–193 | 3.0 | 97.4 | 88.4 |
| iso-Butyl | 2.7 | 1.0 | 4.1 | 2.0 | 194–195 | 3.0 | 94.0 | 87.4 |
| sec-Butyl | 2.4 | 1.0 | 3.8 | 2.0 | 195–196 | 3.0 | 93.0 | 86.8 |
| tert-Butyl | 2.7 | 1.0 | 4.0 | 2.0 | 195–196 | 3.0 | 74.6 | 62.6 |
| Do | 3.0 | 1.0 | 8.1 | 2.0 | 115–118 | 3.0 | 96.2 | 65.0 |
| Ethyl | 2.6 | 1.0 | 3.9 | 2.0 | 197–198 | 3.0 | 96.3 | 79.8 |
| Do | 2.0 | 1.0 | 3.9 | 2.0 | 111–116 | 3.0 | 94.3 | 77.6 |
| n-Amyl | 2.8 | 1.1 | 4.2 | 2.0 | 190–194 | 3.0 | 80.4 | 81.7 |
| n-Octyl | 3.1 | 1.1 | 5.0 | 2.0 | 227 | 4.0 | 88.4 | 84.8 |
| Allyl | 3.1 | 0.65 | 7.3 | 2.0 | 95–109 | 3.0 | 93.6 | 53.3 |
| Do | 2.9 | 1.0 | 8.1 | 2.0 | 110–119 | 3.0 | 94.7 | 60.0 |
| Benzyl | 2.0 | 1.0 | 4.8 | 2.0 | 246–250 | 4.0 | 75.2 | 58.1 |
| Do | 3.0 | 1.0 | 8.2 | 2.0 | 219–221 | 3.0 | 82.9 | 73.7 |
| Cyclohexyl | 3.0 | 1.0 | 4.1 | 2.0 | 192–201 | 4.0 | 93.2 | 87.5 |
| p-Methylcyclohexyl | 2.8 | 1.0 | 4.1 | 2.0 | 188–197 | 4.0 | 94.1 | 90.0 |
| iso-Fenchyl | 3.0 | 1.0 | 4.2 | 2.0 | 232–233 | 4.0 | 48.9 | 43.5 |
| Neopentyl | 2.1 | 1.1 | 4.4 | 2.0 | 188–192 | 3.0 | 78.6 | 72.6 |
| Tetrahydrofurfuryl | 3.4 | 1.1 | 4.3 | 2.0 | 185–203 | 4.0 | 96.6 | 25.3 |

*Temperature at point of contact of reactants.

The following table illustrates the application of the present invention utilizing various forms and combinations of the nitrogen oxides as starting materials, the alcohol being n-butanol and the procedure being essentially that previously described. Water in the required amount in each case was present in the reaction zone.

TABLE II

| Reactant | Mole Reactant per Mole n-Butanol | Temp., °C. | Conversion, Percent | Product Purity |
|---|---|---|---|---|
| HNO₃ | 1.1 | 244–250 | 33.9 | 45.3 |
| HNO₃ | 1.1 | 385–395 | 63.1 | 82.8 |
| HNO₃+NO₂ | 1.0+0.25 | 240–250 | 47.9 | 60.2 |
| HNO₃+NO | 1.3+0.67 | 240–250 | 65.5 | 77.9 |
| NO₂ | 1.0 | 240–250 | 38.9 | 55.5 |
| NO₂ | 1.0 | 350–400 | 53.4 | 74.1 |
| NO₂ | 2.0 | 242–250 | 77.6 | 88.6 |
| NO₂+NO | 0.5+0.5 | 173–201 | 75.2 | 85.2 |
| NO₂+NO | 0.5+1.0 | 182–201 | 85.6 | 93.2 |
| *NO₂+NO | 0.5+1.5 | 180–200 | 86.2 | 97.0 |

*1.0 mole NO recovered in 99% purity.

As is apparent from the foregoing table, the conversion and product purity are affected by both the temperature of the reaction and by the mole ratio of the nitric oxide present. When nitrogen dioxide is reacted with the alcohol in the presence of water at temperatures below 250° C., equimolar proportions of the nitrite ester and nitric acid are formed. By increasing the temperature of the reaction to 350° C., the formation of nitric acid was almost eliminated, and the conversion to nitrite ester increased. These results are consistent with the previously mentioned mechanism of reaction, since a higher temperature increases the decomposition of both nitric acid and nitrogen dioxide.

The volatility of the alcohol and of the nitrite ester produced therefrom are altered by the presence of water, since both form azeotropes. Therefore, by adding a portion of water to the alcohol rather than all to the nitrogen oxides prior to introduction into the reaction zone, the vaporization temperature of the higher boiling alcohols may be considerably reduced, and the volatility thereof increased, thereby permitting a lower reaction temperature. The upper temperature limit is dictated primarily by the thermal stability of the alcohol and of the nitrite ester.

As previously indicated, a diluent to moderate the reaction is needed and water, nitrogen or carbon dioxide are preferred. The following runs illustrate the use of nitrogen as the diluent. Obviously, carbon dioxide would function similarly.

*Example 1*

Nitrogen, nitric oxide, nitrogen dioxide, and isopropyl alcohol were fed continuously to a tubular reactor at the following feed rates: nitrogen, 63 moles per hour; nitric oxide, 5.7 moles per hour; nitrogen dioxide, 5.8 moles per hour; and isopropyl alcohol, 16.6 moles per hour. The reaction was carried out at a pressure of 90 p. s. i. ga. and a temperature of 117° C. The average residence time of the reactants in the reactor was 3.2 seconds. The condensible products were removed from the gas stream leaving the reactor and after 40 minutes of operation the feed streams were stopped. Analysis showed that 4.5 moles of isopropyl alcohol had been converted to isopropyl nitrite. The yield was 89% based on isopropyl alcohol.

*Example 2*

Nitrogen, nitric oxide, nitrogen dioxide, and isopropyl alcohol were fed continuously to a tubular reactor at the following rates: nitrogen, 95 moles per hour; nitric oxide, 8.6 moles per hour; nitrogen dioxide, 9.2 moles per hour; and isopropyl alcohol, 17.4 moles per hour. The reaction was carried out at a pressure of 90 p. s. i. ga. and at a temperature of 115° C. The average residence time of the reactants in the reactor was 2.2 seconds. The condensible products were removed from the gas stream and after 35 minutes of operation the feed streams were stopped. Analysis showed that 6.9 moles of isopropyl alcohol had been converted to isopropyl nitrite. The yield of isopropyl nitrite was 84% based on isopropyl alcohol.

The preferred operating conditions vary with the starting materials. Thus, when nitric oxide and nitrogen dioxide are used, a temperature of between 25° and 50° C. above the lowest temperature at which all of the reactants are in the vapor phase appears to produce the best conversion to the nitrite ester. This temperature is in the range of 100° to 250° C. Using nitric acid of 60 to 90% concentration, or nitrogen dioxide, a reaction temperature above 250° C. produces the greatest conversion to the nitrite ester. While a contact time of from 2 to 4 seconds is preferred, the reaction is operative over a range of from 1 to 10 seconds.

The present process may be used to convert primary, secondary and tertiary alcohols to nitrite esters in high conversions. Only the hydroxyl group of the alcohol molecule is affected during the conversion, and therefore the other constituents on the carbon atom bearing the hydroxyl group may be widely varied. The alcohol may be described by the formula $$R_1R_2R_3COH$$

where $R_1$, $R_2$ and $R_3$ may be hydrogen, aliphatic groups, alicyclic groups, heterocyclic groups, and aromatic groups. In order to carry out the reaction, the alcohol must have a substantial vapor pressure at the temperature of the reaction, either when heated directly or as an azeotrope with water. For purposes of this description, the vaporization temperature of an alcohol may be defined as that temperature at which a substantial amount of the alcohol can be maintained in a vapor phase. Using the foregoing definition, the alcohol must have a vaporization temperature of less than 420° C. in order to fall within the scope of this invention.

This application is a continuation-in-part of my copending application Serial No. 317,011, filed October 27, 1952, now abandoned.

Many variations in procedure can be made without departing from the scope of this invention. Therefore, I intend to be limited only by the following claims.

I claim:

1. A process for the preparation of nitrite esters which comprises reacting a vaporized alcohol with from 0.4 to 0.6 mole of nitrogen dioxide and 0.4 to 2.0 moles of nitric oxide per mole of alcohol in the presence of from 2 to 25 moles of a diluent selected from the group consisting of water, nitrogen and carbon dioxide per mole of alcohol at a temperature between 100° C. and 420° C. the contact time of said reactants being 1–10 seconds.

2. A process for the preparation of nitrite esters which comprises reacting a mixture of a vaporized alcohol, nitrogen dioxide, nitric oxide and a diluent selected from the group consisting of water, nitrogen, and carbon dioxide, at a reaction temperature of from 100° C. to 420° C., each of said compounds being preheated to said reaction temperature prior to mixing, and being present in the ratios of 0.4 to 0.6 mole of nitrogen dioxide, 0.4 to 2.0 moles of nitric oxide and 2 to 25 moles of diluent per mole of alcohol, the contact time of said reactants being 1–10 seconds.

3. A process for the preparation of nitrite esters as claimed in claim 2, wherein the nitrogen dioxide, nitric oxide, and water are obtained by the decomposition of nitric acid at the temperature of the reaction.

4. A process for the preparation of nitrite esters as claimed in claim 2, wherein the nitric oxide is obtained by the decomposition of nitrogen dioxide at the temperature of the reaction.

5. A process for the preparation of nitrite esters which comprises introducing into a reactor in gaseous form a vaporized alcohol, nitrogen dioxide, nitric oxide and water, each of said reactants being preheated to a temperature of from 100° C. to 420° C. and being present in the molar ratios of from 0.4 to 0.6 mole of nitrogen dioxide, 0.4 to 2.0 moles of nitric oxide, and 2 to 25 moles of water per mole of alcohol, maintaining said reactants in said reactor for from 1 to 10 seconds at a temperature between 100° C. and 420° C., and thereafter cooling the reaction mixture to condense the nitrite ester formed.

6. A process as claimed in claim 5, wherein the reactants are preheated to a temperature between 25° C. and 50° C. above the lowest temperature at which the reactants are in a vapor phase, and the temperature of the reactor is maintained within the same range.

7. A process for the preparation of nitrite esters which comprises introducing into a reactor in gaseous form a vaporized alcohol, nitrogen dioxide, nitric oxide and nitrogen, each of said reactants being preheated to a temperature of from 100° C. to 420° C. and being present in the molar ratios of from 0.4 to 0.6 mole of nitrogen dioxide, 0.4 to 2.0 moles of nitric oxide, and 2 to 25 moles of nitrogen per mole of alcohol, maintaining said reactants in said reactor for from 1 to 10 seconds at a temperature between 100° C. and 420° C., and thereafter cooling the reaction mixture to condense the nitrite ester formed.

References Cited in the file of this patent

UNITED STATES PATENTS

| | | |
|---|---|---|
| 2,298,387 | Kenyon et al. | Oct. 13, 1942 |
| 2,739,166 | Treacy | Mar. 20, 1956 |

U. S. DEPARTMENT OF COMMERCE
PATENT OFFICE

CERTIFICATE OF CORRECTION

Patent No. 2,831,882    Charles Philip Spaeth      April 22, 1958

It is hereby certified that error appears in the printed specification of the above numbered patent requiring correction and that the said Letters Patent should read as corrected below.

Column 1, line 22, for "sulfonic acid" read —sulfuric acid—; line 25, for "books or" read —books on—.

Signed and sealed this 24th day of June 1958.

(SEAL)
Attest:
KARL H. AXLINE
Attesting Officer

ROBERT C. WATSON
Commissioner of Patents